United States Patent [19]

Herbelleauu et al.

[11] Patent Number: 5,660,656
[45] Date of Patent: Aug. 26, 1997

[54] TIRE WITH ANCHORED CARCASS

[75] Inventors: Yves Herbelleauu, Riom; Jean-Jacques Pradelle, Clermont-Ferrand, both of France

[73] Assignee: Sedepro, Paris, France

[21] Appl. No.: 331,373

[22] Filed: Oct. 28, 1994

Related U.S. Application Data

[63] Continuation-in-part of Ser. No. 99,917, Jul. 30, 1993, abandoned.

[30] Foreign Application Priority Data

| Aug. 5, 1992 | [FR] | France | 92 09813 |
| Jan. 21, 1994 | [FR] | France | 94 00794 |
| Jan. 21, 1994 | [FR] | France | 94 00795 |
| Jan. 21, 1994 | [FR] | France | 94 00796 |

[51] Int. Cl.$^6$ .............. B60C 9/02; B60C 9/08; B60C 15/00
[52] U.S. Cl. .............. 152/547; 152/539; 152/548; 152/550; 152/555; 152/560
[58] Field of Search .............. 152/539–541, 152/543, 547, 548, 550, 552, 555, 560, 564, 565, 525, 546, 558–559, 561, 510, 196–197

[56] References Cited

U.S. PATENT DOCUMENTS

| 662,963 | 12/1900 | Preston et al. | 152/548 |
| 943,640 | 12/1909 | Latimer | 152/559 X |
| 1,170,597 | 2/1916 | Archer | 152/560 |
| 1,321,403 | 11/1919 | Stowe et al. | 152/539 |
| 1,328,006 | 1/1920 | McLeod | 152/552 |
| 1,349,390 | 8/1920 | Swinehart | 152/552 |
| 1,393,952 | 10/1921 | Miller . | |
| 2,966,933 | 1/1961 | Boussu et al. | 152/540 |
| 3,024,828 | 3/1962 | Smith et al. . | |
| 3,072,171 | 1/1963 | Drakeford et al. . | |
| 3,612,138 | 10/1971 | Ravenhall | 152/543 |
| 3,815,652 | 6/1974 | Pouilloux . | |
| 3,935,894 | 2/1976 | Pouilloux . | |
| 4,214,620 | 7/1980 | Mezzanotte | 152/543 |
| 4,234,029 | 11/1980 | Peter et al. | 152/547 |
| 4,300,973 | 11/1981 | Bezwada | 152/565 |
| 4,471,828 | 9/1984 | Kishida et al. | 152/543 |
| 4,510,291 | 4/1985 | Kawakami . | |
| 4,702,294 | 10/1987 | Kubica et al. | 152/560 |
| 4,824,899 | 4/1989 | Yasuda | 152/547 |
| 4,830,781 | 5/1989 | Oswald | 152/548 |
| 4,895,692 | 1/1990 | Laurent et al. . | |

FOREIGN PATENT DOCUMENTS

| 0255059 | 10/1963 | Australia | 152/555 |
| 182978 | 6/1986 | European Pat. Off. . | |
| 0582196 | 2/1994 | European Pat. Off. . | |
| 0408540 | 3/1910 | France . | |
| 2424993 | 12/1974 | Germany . | |
| 2408474 | 8/1975 | Germany . | |
| 3337190 | 4/1985 | Germany . | |
| 0393312 | 6/1933 | United Kingdom . | |

*Primary Examiner*—Adrienne C. Johnstone
*Attorney, Agent, or Firm*—Brumbaugh, Graves, Donohue & Raymond

[57] ABSTRACT

The carcass cords extend into the bead where they are anchored with at least one pile of circumferentially oriented cords by a rubber mix having a Shore A hardness of more than 70 interposed between the carcass cords and the circumferentially oriented cords. The carcass may be formed from a single cord which passes forward and back from one bead to the other or by cut cords. In some embodiments, the carcass cords are divided in the bead into two circumferential alignments spaced axially apart.

24 Claims, 5 Drawing Sheets

TIRE WITH ANCHORED CARCASS

BACKGROUND OF THE INVENTION

This is a continuation-in-part of U.S. application, Ser. No. 08/099,917, filed Jul. 30, 1993 now abandoned.

The present invention relates to tires. More particularly, it concerns the arrangement of the reinforcement cords in the sidewalls and the beads; it also concerns the anchoring of the carcass cords in the bead.

The carcass reinforcement of tires is generally formed of one or more plies, generally radial, which are turned up around one or more bead wires arranged in the beads. The beads constitute the means which make it possible to mount the tire on the rim. The stiffness of a bead made in this manner is very great.

It is desirable to assure a gradual development of the stiffness of the bead upon moving radially upward in the direction of the sidewall. In the present state of the art it is rather difficult to assure such a gradual development of stiffness between the sidewall and the bead. The sidewall must have substantial flexibility while the bead, on the other hand, must be of substantial stiffness. The reinforcements which are arranged in this part of the tire, as a matter of fact, inevitably have a discontinuity: at the radially upper end of the carcass turn-up one passes without transition into a zone which is free of this carcass turn-up, which zone is therefore inevitably less stiff. As a reminder, "radially upward" or "radially upper" means towards the larger radii from the axis of rotation of the tire.

In the case of radial carcasses, the prior art includes designs which make it possible to avoid turn-ups around a bead wire. As an example, U.S. Pat. No. 3,072,171 relates to one such design which eliminates the turn-up of the carcass plies and provides circumferentially oriented cords alongside the radially oriented carcass cords. In this known structure, it is difficult to assure a sufficiently strong anchoring of the carcass cords to the circumferentially oriented cords, and as a consequence this proposal has never been actually employed.

SUMMARY OF THE INVENTION

The object of the present invention is to propose a new manner of arranging the carcass reinforcement cord so as to be able to assure as gradual as possible a change of the stiffness in flexure of the sidewall of the tire upon approaching the bead, while permitting the anchoring of a very large number of carcass cord portions.

Another object of the invention is to provide a tire reinforcement structure which readily lends itself to mechanized manufacture.

The tire in accordance with the invention, has at least one carcass anchored in each side of the tire in a bead, the base of which is intended to be mounted on the tire's design rim seat, each bead being extended upward by a sidewall, the sidewalls joining a tread towards the top, the carcass comprising portions of carcass cord arranged adjacent each other and forming, in the upper part of the sidewall, a single circumferential alignment of cord portions extending downward from the top of the sidewall towards the bottom of the bead, the said alignment being extended toward the bottom of the bead in a single circumferential alignment or divided into at least two axially spaced circumferential alignments, and carcass anchoring means in the bead bordering in the axial direction at least one side of at least one circumferential alignment to reinforce and stiffen the bead. The carcass anchoring means in the bead can include circumferentially oriented cords or a filler with or without circumferential cords.

The carcass reinforcement of the present invention, in one embodiment, is formed from at least one carcass cord which extends in forward paths from the sidewall down to the bead and in return paths from the bead up the sidewall. The forward and return paths are arranged adjacent each other and are aligned circumferentially with a loop connecting a forward path to a return path, the forward and return paths of the at least one carcass cord forming one or more circumferential alignments in the bead. In the bead, at least one circumferential alignment of carcass cord portions is bordered, on at least one side in the axial direction, by at least one pile of circumferentially oriented cords with a layer of rubber stock having a Shore A hardness of more than 70 interposed between the carcass cord portions and the circumferentially oriented cords to prevent direct contact between the cord and cord portions while assuring good transmission of the forces between the cord and cord portions.

In another embodiment, the carcass reinforcement is formed from a continuous carcass cord with the alignments extending towards the bottom of the bead divided into at least two axially spaced circumferential alignments, all the cord portions of each of the alignments of the bead being connected together, two by two in each alignment, by a loop located at the radial level closest to the base of the bead with all of the circumferentially oriented cords located between divided axially spaced circumferential alignments in the bead or alternatively laterally adjacent one or both sides of the circumferential alignments in the bead, a rubber stock having a Shore A hardness of more than 70 being interposed between the circumferentially oriented cords and each adjacent alignment of carcass cord portions.

In another embodiment, the axially spaced, divided, circumferential alignments are separated by a filler material with or without circumferentially oriented cords with at least one of the alignments of the bead bordered laterally, axially on the side opposite the filler material, by a pile of circumferentially oriented cords, the carcass reinforcement being formed from a continuous carcass cord, all of the cord portions of each of the divided alignments being connected together, two by two in each alignment, by a loop located at the radial level closest to the base of the bead. In the bead in accordance with this embodiment of the invention, upon passing from the sidewall to the bead, the carcass cord portions distribute themselves on the two sides of the filler material. Preferably, in order that each of the carcass cord portions contributes substantially identically to the taking up of forces due to the inflation, each of said alignments in the bead is bordered laterally by at least one pile of circumferentially oriented cords, arranged axially on the side of each alignment opposite the filler material.

In still another embodiment, the term cord "portion" as used herein means a piece of cut cord having two ends instead of a single continuous cord, the portions in the upper part of the sidewall being circumferentially aligned and the lower ends of adjacent cords being divided into at least two axially spaced circumferential alignments separated by a filler material. In the bead developed in accordance with this embodiment of the invention, upon passing from the sidewall to the bead, the lower ends of the carcass cord portions distribute themselves on the two sides of the filler material to define at least two axially spaced circumferential alignments of cord portions in the bead. Preferably, in order that each of the carcass cord portions contributes substantially identically to the taking up of the forces due to inflation, each of said alignments of the bead is bordered laterally by at least one pile of circumferentially oriented cords.

In the present specification, the expression "cord" designates, in general, both monofilaments and multifilaments or assemblies such as cables, twists, or any type of equivalent assembly, and this, whatever the material and the treatment of these cords, for instance surface treatment or coating or presizing in order to promote their adherence to the rubber. A carcass will be said to be radial when its cords are arranged at 90°, but also, in accordance with the customary terminology, at an angle close to 90°. The term "carcass" means the arrangement of reinforcement which can be found substantially aligned circumferentially somewhere along the path of the carcass, e.g., in the upper part of the sidewalls or under the tread.

It is known that, in the present state of the art, the carcass ply or plies are turned up around a bead wire. The bead wire then serves a function of anchoring the carcass, that is to say it takes up the tension which is developed in the carcass reinforcement under the effect of the inflation pressure. The embodiments described herein serve the function of anchoring the carcass.

It is also known, still in the prior art, for the bead wire itself furthermore to assure a function of clamping the bead on its rim. The arrangements described herein are also capable of assuring sufficient clamping.

The invention makes it possible to use a greater density of cords. Stated differently, there is an increase in the number of carcass cord portions above which it would be necessary to have recourse to a separate additional carcass, due to lack of space in the bead to accommodate all of the cord portions.

It goes without saying that the invention can be used by adding, on one and/or the other side of the structure claimed, other elements which also form a part of the carcass or its anchoring, as certain variants will illustrate. Likewise, the invention can be used by multiplying the carcasses of the same kind, or even by adding a different type of carcass to a carcass in accordance with the invention.

DESCRIPTION OF DRAWINGS

For a more complete understanding of the present invention, reference can be made to the detailed description which follows, read with reference to the drawings, in which.

DESCRIPTION OF PREFERRED EMBODIMENTS

Figure 1:
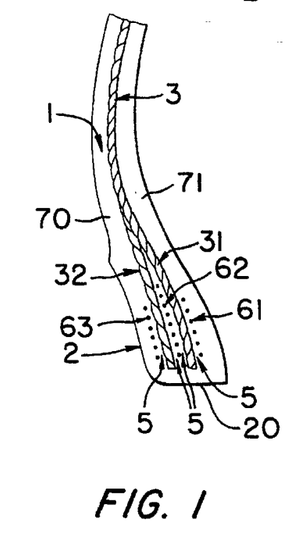
FIG. 1 is a radial section showing essentially a sidewall and a bead of a tire in accordance with one embodiment of the invention.
Figure 2:
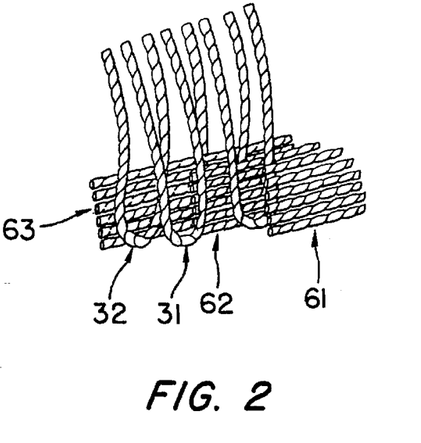
FIG. 2 is a perspective view of the arrangement of the reinforcement cord portions shown in FIG. 1.

FIGS. 1 and 2 show the sidewall 1 and bead 2 of a tire in which the carcass reinforcement is formed by portions of cord 3 which are oriented radially in the sidewalls 1.

In each sidewall 1 the carcass cord 3 forms a single circumferential alignment of juxtaposed radial portions of cord, and starting from a sidewall in the direction of the bead 2, the carcass is divided into two circumferential alignments of radial cords 31, 32 which progressively move axially away from each other. Each circumferential alignment of radial cords 3 is bordered on each side by a pile of circumferentially oriented cords with the interpositioning of a layer of rubber having the composition described below. The alignment 31 is bordered by the piles 61 and 62 and the alignment 32 is bordered by the piles 62 and 63. All the piles of circumferentially oriented cords are produced here by spiral winding. It is advantageous that the median pile 62 rises radially further upward than the side piles 61 and 63.

This leads to a staggered arrangement which is clearly shown in the perspective view of FIG. 2, where it is clearly seen that the different alignments are separated by a stack of circumferentially oriented cords.

There could, of course, be more than two circumferential alignments of radial cords extending progressively axially away from each other. In such case, each alignment is formed from a single carcass cord which forms radial forward and return paths. The cord portions of the different alignments are disposed in such a manner that, in the sidewalls, two adjacent carcass cord portions come from different alignments in the bead 2. Stated differently, there is an interlacing of the cords of each alignment in the sidewall but not in the bead, so that, there also, the loops of each alignment do not overlap.

This embodiment is of particular interest since, at the level of the sidewall 1 of the tire, there is a single circumferential alignment of radial cord portions (in a single layer). This is of such a nature as to permit very great flexibility of the sidewalls; the flexural rigidity of the sidewall to the crushing of a tire provided with such a reinforcement structure remains small, smaller than when there are two carcass plies, as in the tires currently employed.

As the bead 2 is approached, the carcass cords 3 distribute themselves in two circumferential alignments which move apart progressively from each other, and one can, of course, adjust the height at which this separation into several alignments is organized by interposing rubber over a selected height.

In this way, the flexural rigidity is increased very progressively. Furthermore, the number of radial portions of cord in an alignment within the bead is divided by two as compared with the number of radial portions in the alignment itself of the sidewall, which is very advisable since, as the radius is smallest at the height of the bead, there is less room to place the aligned cords than in the sidewall. This distribution of the cords favors the perfect positioning of them with good impregnation with rubber.

The density of the circumferentially oriented cords is preferably less in the sidewall 1 than in the beads 2. It is desirable that the variation in density be progressive, so as to assure a transition as progressive as possible between the bead and the sidewall of the tire.

It is seen that the radial carcass reinforcement structure proposed permits a progressive development of the rigidities between the sidewall and the bead. This structure offers the designer of the tire very great latitude for adjustment of this rigidity and its evolution by simply acting on the density of the circumferentially oriented cords and possibly on the number of circumferential alignments of the carcass cords in the beads, and on the nature of the cords.

By arranging the cord in loops, one avoids all cut edges, which constitute discontinuities. In actual fact, the reinforcement cord is generally a cable; the cable ends show, at the place of the cut, flarings in which all the monofilaments are apart from each other. This constitutes incipient points of rupture within the tire. When the cords consist of textile, they are sized in order to assure very good adherence to the rubber. Unfortunately, there is no presizing on each cable end after it has been cut, with the result that there also the rubber does not adhere at the place of the cut, and therefore there is risk of incipient ruptures within the bead. With the arrangement described here, this type of drawback need not be feared.

By the presence of loops between forward and return paths, it is seen that the carcass is of the "single cord" type. Of course, the carcass might be produced otherwise than continuously from a single cord. In accordance with this embodiment the present invention, however, it is advisable to use only a small number of cords and to arrange the starting and ending points of the cord below the tread rather than in the beads.

In order to assure a perfect anchoring of a carcass, a stratified composite bead is produced. Within the bead 2, the piles 61 and 62 of circumferentially oriented cords are arranged on both sides of each of the circumferential alignments in the bead with the interposition of a layer 5 of a rubber mix of a Shore A hardness of more than 70. In each pile 61, 62, the cords are substantially concentric and superposed. One can, for instance, wind several turns of preferably a brass-coated metal wire in rings of progressively increasing diameter.

It is not necessary to add a rubber mix which is specific for assuring the impregnation of the carcass cord 3 or the cord windings forming the piles 61 or 62, but it is necessary to avoid direct contact between the circumferentially oriented cords and the carcass cords. The same type of mix assures the functions of calendering and connection between the portions of cord of one and the same pile and between the different piles of cord by impregnation during molding.

Experiments have shown very interesting results as to life by using for the interposed rubber layers 5 a mix containing an SBR synthetic elastomer used by itself or blended with polybutadiene, the said SBR having a glass transition temperature (Tg) of between −70° C. and −30° C. and the said polybutadiene having a Tg of −40° C. and −10° C., the said synthetic elastomer or elastomers being used in a total proportion of at least 40% of the total weight of elastomer, the balance being formed of natural rubber. The Tgs in question are measured by differential thermal analysis. An SBR solution is preferably used. For instance, a mix is used containing 50% SBR solution having a Tg of −48° C., 50% natural rubber (NR), with addition of reinforcing fillers and resin in order to obtain the Shore A hardness desired. The layers 5 can be obtained in the vulcanized tire because in the assembling of the tire, rubber has been deposited for the sole purpose of producing said layers, or because, in order to obtain the windings 61, 62, and/or possibly in order to form the carcass, cord has been used which is sufficiently coated with rubber so that the layers 5 appear after molding.

Instead of rubber base mixes such as indicated above, one could also use thermoplastic resins (aliphatic polyamide, polyphenylene oxide) or thermosetting resins (phenol formaldehyde resins) which make it possible to obtain suitable rigidity and adherence.

In order to obtain good adherence of a layer 5 of rubber to both the brass-plated metal wires of the piles 61, 62 and the textile cords 3 of the carcass, and in order to assure good endurance of this bonding at high temperature, the said layer 5 of rubber contains a large amount of sulfur and adhesion-promoting additives are employed (for instance, metal salts of cobalt or nickel) in well-adjusted proportions. For example, an amount of sulfur of between 5 and 8% of the total weight of elastomer and an amount of cobalt of 0.2% of the total weight of elastomer are used.

In order to assure an excellent taking up of the tension appearing in the carcass cords under the effect of the inflation pressure, it is desirable for said loops to be arranged radially at a level below the lowest part of the adjacent circumferentially oriented piles of cords.

The carcass cord 3 in this embodiment preferably forms forward and return paths from one bead 2 of the tire to the other passing below the tread; the cord is therefore continuous from one bead to the other.

The different reinforcement means of the structure of the tire below the tread do not form part of the present invention. It is sufficient to point out that they may be formed, for instance, by any suitable method of reinforcement such as, for instance, cords arranged in such a manner as to assure a triangulated belting. Furthermore, one can, to be sure, arrange within the bead a very stiff rubber mix of the type used for the filler on a bead wire in conventional tires. This filler rubber is arranged on one side or on both sides of the carcass reinforcement.

When the tire mounted on the rim for which it is designed is subjected to alternating deformations, the region of contact with the rim, that is to say the part of the bead located below the rim flange, suffers practically no deformation. The upper part of the sidewall, that is to say, as a general rule, the portion between the equator and the shoulder of the tire, flexes rather strongly in order to impart the necessary flexibility to the tire. The equator is the widest part of the sidewall, corresponding to the maximum size of the tire mounted on its rim.

In order to assure as progressive as possible a transition between the region of contact with the rim and the equator above the region of contact with the rim and below the equator, the rubber components located on both sides of the carcass satisfy the following equation:

$$\frac{\Sigma_i E_i e_i (\text{outside})}{\Sigma_j E_j e_j (\text{inside})} \geq 3$$

in which $E_i$ and $E_j$ are Young's moduli in the radial direction and $e_i$ and $e_j$ are the thicknesses of each component "i" and "j" of rubber on the outside 70 and the inside 71 of the carcass cord, respectively. When there are several carcass alignments in said portion of the tire, only the components on the outside of the outermost cord and on the inside of the innermost cord respectively will be considered.

When the modulus of all the components employed is comparable, this means that it is advisable to have the carcass pass as much as possible on the inner side of the sidewall. One can also use softer rubbers (that is to say, of lower modulus) on the inner side of the sidewall. This assures a good compromise between the life of the tire and the comfort which it produces.

Figure 3:
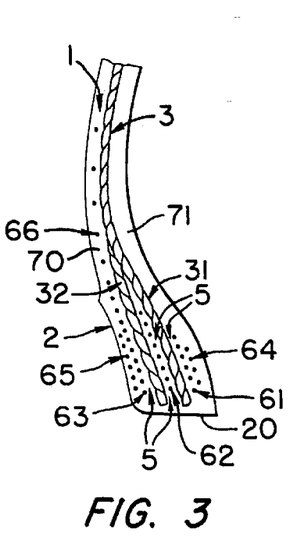
FIG. 3 is a radial section showing a second embodiment of the invention.

FIG. 3 shows an embodiment of the invention in which the circumferential cord windings 64 and 65 have been added within the bead 2. Only thin layers of rubber remain between the cords, that is to say layers which are not thicker than the diameter of the cords of the windings or the alignments.

In the same figure it is seen that there are circumferentially oriented portions of cord 66 rising radially upward in the portion of the sidewall 1 located below the equator. This makes it possible to impart shapes different from the natural equilibrium shapes of an inflated radial carcass. One can also excellently control the shape of the tire when it is inflated on the wheel. One can, of course, use cords of different kind in the sidewalls and in the bead, or on the inside of them.

Figure 4:
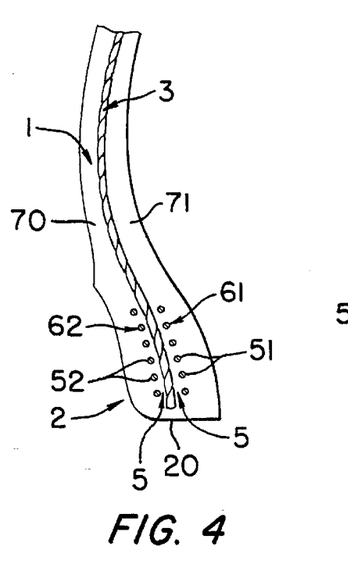
FIG. 4 shows a third embodiment of the invention in radial section of the sidewall and the bead of the tire.
Figure 5:
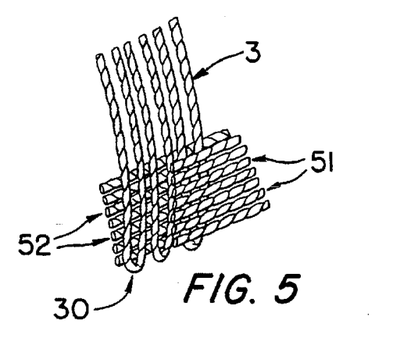
FIG. 5 is a perspective view showing a part of the reinforcement cord portions arranged in a manner which corresponds to the embodiment of FIG. 4.

FIGS. 4 and 5 show an embodiment of the invention usable, for example, if there is enough room in the bead for a single circumferential alignment of all the cords of the carcass. It is the case if the number of cords used in one carcass is not too great. In this case, there is no division of the carcass.

In FIGS. 4 and 5, the carcass reinforcement is formed by portions of cord 3 which are oriented radially in the sidewalls. The cord 3 forms juxtaposed loops 30 located within the bead. The loops are adjacent each other and do not overlap.

In order to assure anchoring of the carcass, a stratified composite bead is produced. Within the bead, a pile of circumferentially oriented cords (plies 61 and 62) are arranged on both sides of the forward and return paths of the carcass cord 3, with the interposition of a layer 5 of a rubber mix of a Shore A hardness of more than 70. In each pile 61, 62, the cords are substantially concentric and superposed. One can, for instance, wind several of preferably a brass-coated metal wire in rings of progressively increasing diameter.

Figure 6:
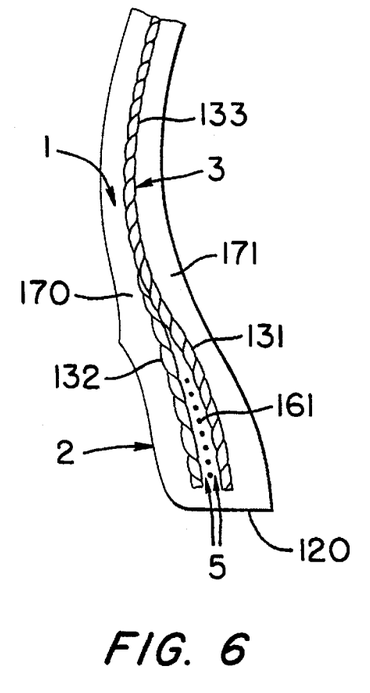
FIG. 6 is a radial view of a sidewall and a bead of a tire in accordance with another embodiment of the invention.
Figure 7:
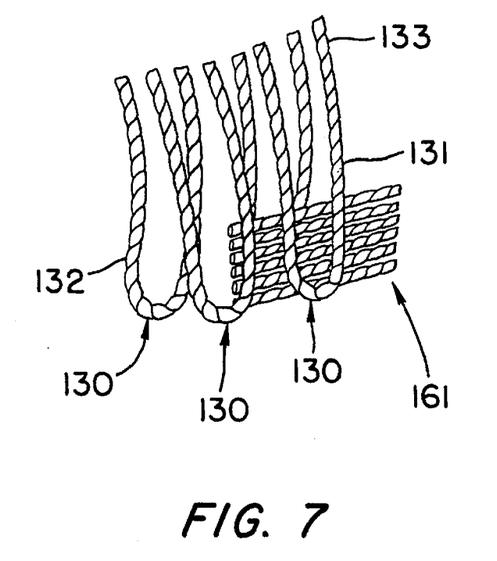
FIG. 7 is a view in perspective of the arrangement of the reinforcement cord portions in the embodiment of FIG. 6.

The embodiment shown in FIGS. 6 and 7, is similar to the embodiment of FIGS. 1 and 2, except that the assembly of circumferentially oriented cords arranged in the bead is located in its entirety between the alignments 131, 132 of the carcass cord. In the embodiment shown in FIG. 8, each sidewall 1 has more than one circumferential alignment 3 embedded therein.

Figure 8:
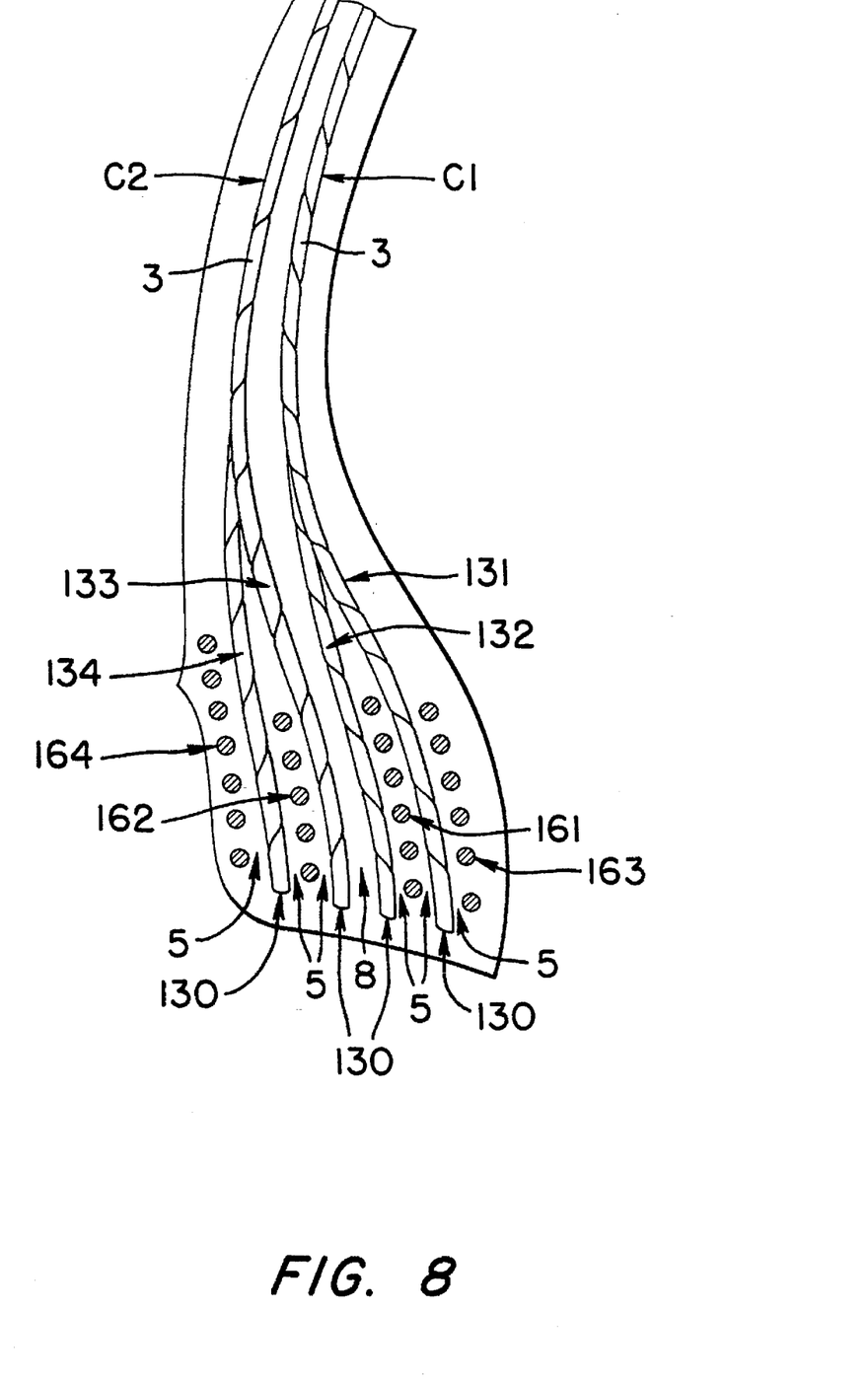
FIG. 8 is a radial section showing another embodiment of the invention.

In FIGS. 6 to 8, each carcass cord, which forms in each sidewall 1 a single circumferential alignment 3 of forwards and returns forming juxtaposed cord portions, is arranged in such a manner that, starting from a sidewall and extending into a bead 2, the carcass is divided into two circumferential alignments of radial cords 131, 132 or 133, 134 moving gradually axially away from each other. The carcass cord portions are preferably arranged in such a manner that, in the sidewalls, two adjacent portions of carcass cord come from different alignments of the bead 2. Stated differently, there is an alternation within the sidewall of cords coming from each of the alignments 131 and 132 or 133 and 134 of the bead 2.

This leads to a staggered arrangement which can be clearly noted from the perspective view of FIG. 7. The two alignments are separated by a pile 161 of circumferentially oriented cords with interposition of rubber 5, which makes it possible to impregnate the cords and assure the perfect cohesion of the bead while maintaining the alignments 131 and 132 separated axially from each other. This distribution of the cords favors the perfect positioning of the portions of cord and also their loops, with good impregnation by the rubber. The height at which this separation into several alignments takes place can be adjusted. In this way, the stiffness in flexure is increased very gradually.

There could also be present within the bead more than two circumferential alignments of cords which gradually move axially away from each other, all coming from the same circumferential alignment of the sidewall. In such cases, the number of cords of each alignment in the bead is divided by two, or more than two, as compared with the number of cords of the alignment of the sidewall from which they come, which is very important since, as the radius is smaller at the level of the bead, there is less room to accommodate the aligned cords than in the sidewall.

In order to assure a perfect anchoring of the carcass, a stratified composite bead is developed. Within the bead 2, between the carcass cord alignments 131, 132, circumferentially oriented cords 161 are arranged. They are arranged in a pile as shown in FIGS. 6 and 7 or in several adjacent piles or in packages, or in any judicious arrangement, depending on the type of tire. Each circumferential alignment of carcass cords is bordered, axially on the side where the circumferentially oriented cords 161 are arranged, by a layer 5 of a rubber stock having a Shore A hardness more than 70, assuring the connection between the cords.

The layers 5 can be obtained in the vulcanized tire because rubber has been deposited for the sole purpose of producing said layers 5, or because the cord has been sufficiently coated with rubber so that the layers 5 appear after molding.

It is not necessary to add a rubber stock which is formulated specifically and solely in order to assure the impregnation of the carcass cord 3 or of the circumferential cord windings 161. The same type of stock as that formulated for the layers 5 assures the functions of calendering and bonding between the portions of cord of the same pile and between the different piles of cord, by impregnation upon the molding.

In FIG. 8, the invention is applied to a reinforcement comprising two carcasses C1 and C2. Their anchoring is assured by two structures, one of which is the mirror image of the other. In each case, there is a structure similar to that shown in FIGS. 6 and 7 to which there has been added, axially and on a single side, a pile 163, 164 of circumferentially oriented cords. The adjacent alignments 132, 133 belonging to different carcasses are separated in the bead 2 from each other by a filler material 8 which is without circumferential cords.

In order to assure as gradual a transition as possible between the zone of contact with the rim and the equator, above the zone of contact with the rim and below the equator, the rubber components located on the two sides of the carcass satisfy the relationship described above in connection with the embodiments of FIGS. 1 and 2. When there are several carcass alignments 3 in this part of the tire, in particular in the sidewall, as in FIG. 8, only the components on the outside of the outermost cord and on the inside of the innermost cord, respectively, are considered for the application of this formula.

Figure 9:
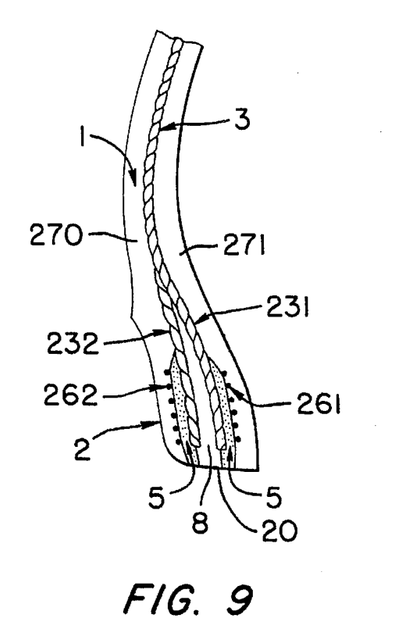
FIG. 9 is a radial section showing a sidewall and a bead of a tire in accordance with another embodiment of the invention.
Figure 10:
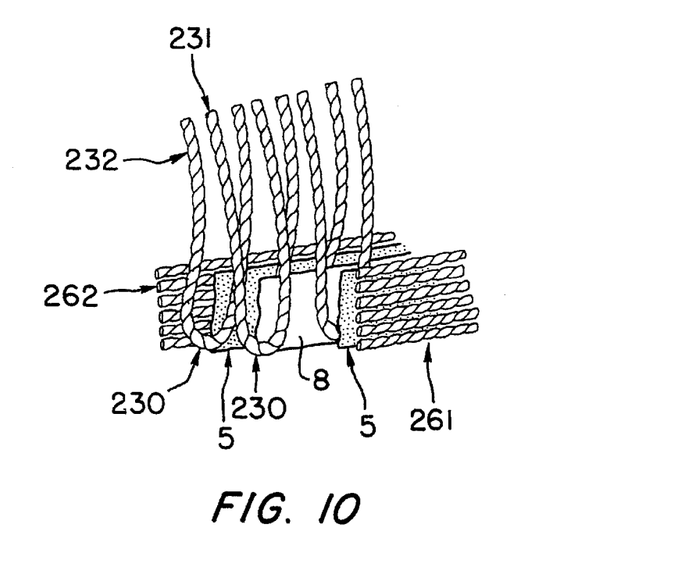
FIG. 10 is a view in perspective showing the arrangement of the reinforcement cord portions and of certain layers of rubber of the embodiment shown in FIG. 9.
Figure 11:
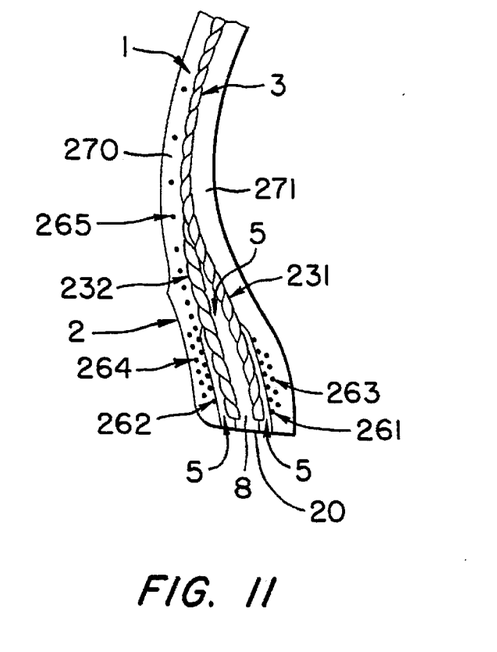
FIG. 11 is a radial section showing another embodiment of the invention.

In FIGS. 9 to 11, the carcass cord, which forms in each sidewall 1 a single circumferential alignment 3 of forwards and returns forming juxtaposed cord portions, is arranged in such a manner that, starting from a sidewall in order to reach the base of a bead 2, the carcass is divided into two circumferential alignments of radial cords 231, 232 moving gradually axially away from each other.

A layer of filler rubber 8 impregnates the cords and assures the perfect cohesion of the bead while maintaining the alignments 231 and 232 separated axially from each other. This distribution of the cords favors the perfect positioning of the portions of cord and also their loops, with good impregnation by the rubber. The height at which this separation into several alignments takes place can be adjusted by interposing a layer of rubber 8 over a selected height and possibly by a gradually variable axial thickness. In this way, the stiffness in flexure is increased very gradually.

In the variants shown in FIGS. 9 to 11, the tire has a stratified composite structure formed by the following adjacent layers: a pile of circumferentially oriented cords 261, a layer 5 of a rubber stock having a Shore A hardness of more than 70, a circumferential alignment 231 of carcass cords, a layer 8 of a filler rubber stock, a circumferential alignment 232 of carcass cords, a layer 5 of a rubber stock having a Shore A hardness of more than 70, and a pile of circumferentially oriented cords 262. This makes it possible suitably to balance the taking up of the tension appearing in the carcass cords under the effect of the inflation pressure.

The layers 5 can be obtained in the vulcanized tire because, upon the assembling of the tire, rubber has been deposited for the sole layers of producing said layers, or else because, in order to obtain the windings 261, 262, and/or possibly in order to form the carcass, cord has been used which is sufficiently coated with rubber so that the layers 5 which have just been described appear after molding.

The cord employed for the piles of circumferentially oriented cord, as explained above, is preferably a brass-coated metal wire. In each pile 261, 262, the cords are substantially concentric and superposed. As to the manner of obtaining said piles of cord, rings of progressively increasing diameter can be placed one on top of the other or else several turns of cord can, for instance, be wound.

The same type of stock as that formulated for the layers 5 assures the functions of calendering and bonding between the portions of cord of one and the same pile and between the different piles of cord, by impregnation upon the molding. For the sake of convenience, the rubber stock of the layer 8 can be the same as that of the layers 5.

In FIG. 11, it is seen that inner and outer circumferential cord windings 263 and 264 have been added within the bead 2. Between the cords there subsist only thin layers of rubber, that is to say, layers which are not thicker than the diameter of the cords of the winding or of the alignments. These thin layers can be obtained after molding since, upon the assembling of the tire, rubberized cord has been wound in order to obtain the piles 263 and 264 and also, possibly, the piles 261 and 262.

If necessary, the adjacent piles of windings of circumferential cords are multiplied in order to reinforce the beads. The grouping of several adjacent piles such as 261, 263 or 262, 264, plus other possible piles, creates packets of cords. It is obvious that another solution could consist in arranging all of these cords in a manner other than in substantially radially oriented piles, since the assembly of the cords occupies an approximately equivalent radial section.

From the same figure it is seen that there are circumferentially oriented cord windings 265 which rise radially upward in the portion of the sidewall 1 located below the equator. This makes it possible to impart different shapes of the forms of natural equilibrium of an inflated radial carcass. One can thus excellently control the shape and the stiffnesses of the tire when it is inflated on the wheel. One can, of course, use cords of a different nature in the sidewalls and the bead, or on the inside of them. Of course, this arrangement can be used with any of the variants described.

Since the density of the circumferentially oriented cords is preferably less in the sidewall 1 than in the beads 2, it is desirable that the variation in density be gradual so as to assure as gradual a transition as possible between the bead and the sidewall of the tire. Similarly, each of the piles of circumferentially wound cord, for example the piles 261, 262, can terminate radially at the top in a zone of lesser density.

Figures 12, 13, 14:
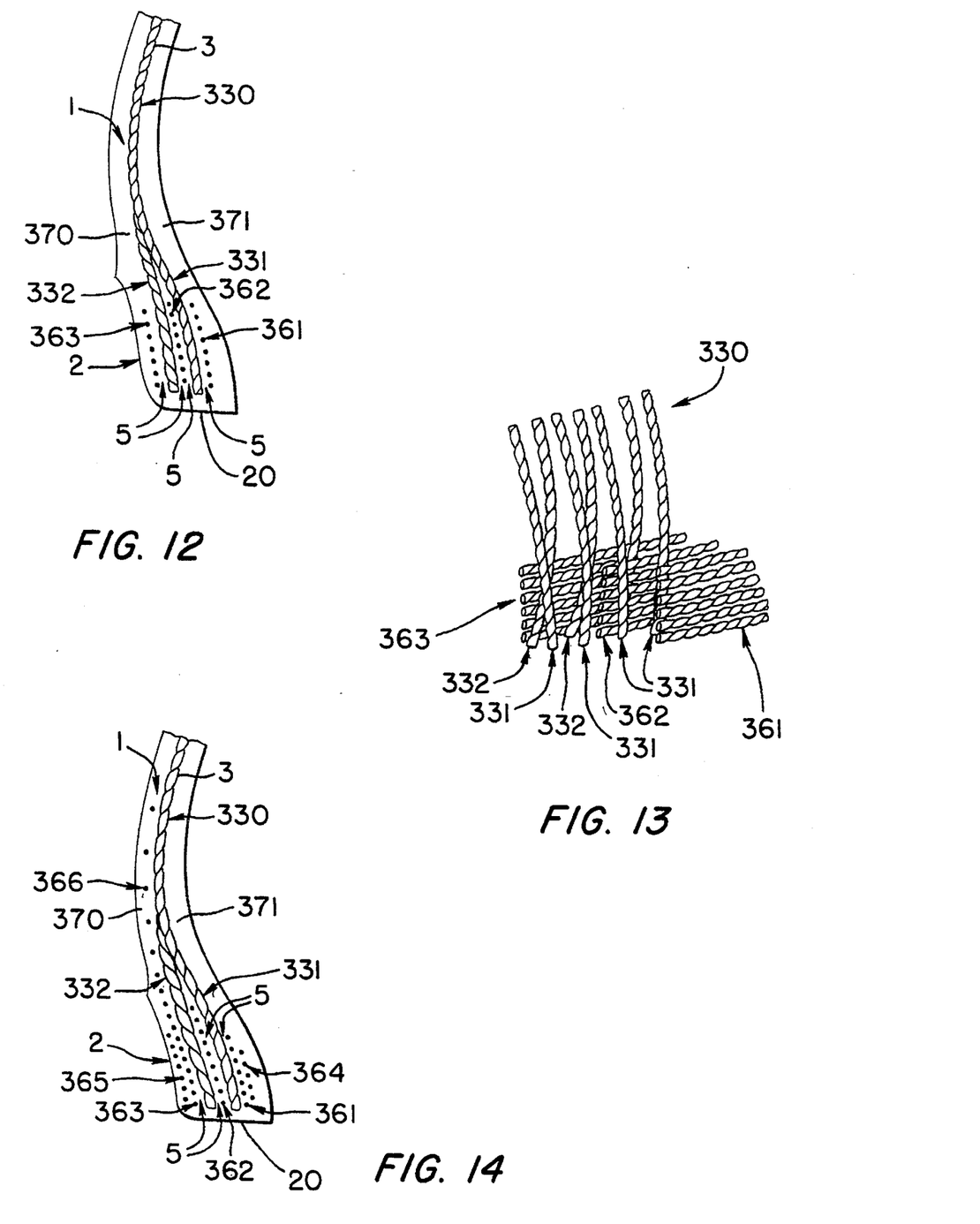
FIG. 12 is a radial section showing a sidewall and a bead of a tire in accordance with still another embodiment of the invention.
FIG. 13 is a view in perspective showing the arrangement of the reinforcement cord portions in the embodiment of FIG. 12.
FIG. 14 is a radial section showing still another embodiment of the invention.

In FIGS. 12 and 13, the carcass reinforcement is formed by portions of cord 3 oriented radially in the sidewalls 1 and having cut ends which terminate in the beads. The cord portions are preferably arranged in such a manner that, in the sidewalls, two adjacent portions of carcass cord come from different alignments of the bead 2. Stated differently, there is an alternation within the sidewall of the cords coming from each of the alignments 331 and 332 of the bead 2.

This leads to a staggered arrangement which can be clearly noted from the perspective view of FIG. 13. The two alignments 331 and 332 are separated by a filler element, which makes it possible to increase the stiffness in flexure very gradually. As in embodiments described above, the number of cords in an alignment within the bead is divided by two as compared with the number of cords present in the alignment of the sidewall.

In this variant, like the one illustrated in FIG. 14, at the level of the sidewall 1 of the tire, there is a single circumferential alignment of cord portions (that is to say, a single layer of cords). This is of such a nature as to permit a very great flexibility of the sidewalls: the stiffness in flexure of the sidewall to the crushing of a tire provided with such a reinforcement structure is slight, much lower than when there are two carcass plies as in architectures currently employed when the number of carcass cords is multiplied, in the case of strongly stressed tires, or when less resistant cords are used.

In order to assure a perfect anchoring of a carcass, a stratified composite bead is produced. Within the bead 2, axially on both sides of each alignment 331, 332 of the bead, there is arranged at least one pile of circumferentially oriented cords 361, 362 and 362, 363, with the interposition of a layer 5 of rubber stock having a Shore A hardness of more than 70.

The cord employed for the piles of circumferentially oriented cord is preferably a brass-coated metal wire. In each pile 361, 362, 363, the cords are substantially concentric and superposed. As to the manner of obtaining said piles of cord, rings of progressively increasing diameter can be placed one on top of the other or else several turns of cord can, for instance, be wound.

FIG. 14 shows another variant embodiment of the invention in which added circumferential cord windings 364 and 365 have been added within the bead 2. Between the cords there subsist only thin layers of rubber, that is to say layers which are not thicker than the diameter of the cords of the winding or of the alignments. These thin layers can be obtained after molding since upon the assembling of the tire, rubberized cord has been wound in order to obtain the piles 364 and 365 and also, possibly, the piles 361, 362 and 363.

If necessary, the adjacent piles of windings of circumferential cords are multiplied in order to reinforce the beads.

The grouping of several adjacent piles such as 361, 364 or 363, 365, plus other possible piles, creates packets of cords. It is obvious that another solution could consist in arranging all of these cords in a manner other than in substantially radially oriented piles, since the assembly of the cords occupies an approximately equivalent radial section.

From the same figure it is seen that there are circumferentially oriented cord windings 366 which rise radially upward in the outer portion of the sidewall 1 located below the equator. This makes it possible to impart different shapes of the forms of natural equilibrium of an inflated radial carcass. One can thus excellently control the shape and the stiffnesses of the tire when it is inflated on the wheel.

Since the density of the circumferentially oriented cords is preferably less in the sidewall 1 than in the beads 2, it is desirable that the variation in density be gradual so as to assure as gradual a transition as possible between the bead and the sidewall of the tire. Similarly, each of the piles of circumferentially wound cord, for example the piles 361, 362,363, can terminate radially at the top in a zone of lesser density.

It is seen that the reinforcement structure proposed permits a gradual development of the stiffnesses between the sidewall and the bead. This structure offers the tire designer very great latitude in regulating this stiffness and its development by simply varying the density of the circumferentially oriented cords and possibly the number of circumferential alignments of carcass cords in the beads, and the nature of the cords.

This composite structure makes it possible to obtain a good seat of the bead on its rim, while being less bulky and making the best use of the materials employed.

The structures proposed herein present no discontinuity of reinforcement, which is very favorable for the life of the tire and which also leads, unexpectedly, to greater comfort of the tire.

In order to position the reinforcement cords as precisely as possible, it is very advantageous to build the tire on a rigid support, for instance a rigid core imposing the shape of its inner cavity. All the components of the tire, which are disposed directly in their final place, are applied onto this core in the order required by the final architecture, without undergoing shaping at any moment of the building. In this case, the tire can be molded and vulcanized in the manner explained in U.S. Pat. No. 4,895,692.

It should be understood that although certain teachings and features, for example, features relating to the number of carcasses, the way of obtaining rubber layers, namely, the layer 5, the different rubber mixes used, the possibility of precoating the cords before laying them in the building of the tire and the type or density of the cords, have been described herein in connection with one of the embodiments, these teachings and features obviously may often be used with other embodiments of the invention.

We claim:

1. A tire comprising at least one carcass anchored in each side of the tire in a bead, the bead having a base which is intended to be mounted on the tire's design rim seat, each bead being extended radially upward by a sidewall, the sidewalls joining a tread, the carcass comprising at least one carcass cord which extends in forward paths from the sidewall down to the bead and in return paths from the bead up the sidewall, the forward and return paths being arranged adjacent each other in the bead and being aligned circumferentially in the bead, a loop connecting each forward path to a return path, the forward and return paths of each carcass cord forming at least one circumferential alignment in the bead, and carcass anchoring means laterally bordering the at least one circumferential alignment in the bead on at least one side in the axial direction, said carcass anchoring means including at least one pile of circumferentially oriented cords taking up the tension which is developed in the carcass upon inflation solely by the adherence of each carcass cord laterally with the anchoring means.

2. A tire according to claim 1 in which there is at least one circumferential alignment which, passing from the sidewall in the direction of the base of the bead, is divided into at least two circumferential alignments extending progressively axially away from each other.

3. A tire according to claim 2, in which each alignment arranged in the bead is formed from a single carcass cord forming forward and return paths, and in which, at the level of the sidewalls, each two adjacent portions of carcass cord come from different alignments in the bead.

4. A tire according to claim 1, in which the at least one carcass cord is oriented radially within the sidewall.

5. A tire according to claim 1, in which the said loops are arranged radially at a level lower than the lowest part of the at least one adjacent pile of circumferentially oriented cords.

6. A tire according to claim 1, in which, within the portion of the sidewall located just above the region of intended contact with the design rim and below the equator, the rubber components located axially on both sides of the at least one carcass satisfy the relationship $$\frac{\Sigma_i E_i e_i (\text{outside})}{\Sigma_j E_j e_j (\text{inside})} \geq 3$$

in which $E_i$ and $E_j$ are the radial moduli in radial direction and $e_i$ and $e_j$ are the thicknesses of each component "i" and "j" in rubber on the outside and the inside, respectively, of the at least one carcass.

7. A tire as set forth in claim 1 in which the means for anchoring the carcass includes a layer of rubber mix having a Shore A hardness of more than 70 interposed between the at least one circumferential alignment and the circumferentially oriented cords.

8. A tire according to claim 7, in which the layer of interposed rubber mix is a mix containing a styrene/butadiene rubber hereafter referred to as an SBR synthetic elastomer, wherein the SBR synthetic elastomer is blended with polybutadiene, the glass transition temperature Tg of which is between −40° C. and −10° C. the total proportion of SBR synthetic elastomer and polybutadiene being equal to at least 40% of the total weight of elastomer.

9. A tire according to claim 7, in which the layer of interposed rubber mix is a mix containing a styrene/butadiene rubber hereafter referred to as an SBR synthetic elastomer, the glass transition temperature Tg of which is between −70° C. and −30° C., in a proportion of at least 40% of the total weight of elastomer.

10. A tire according to claim 9, in which the SBR synthetic elastomer is of solution type.

11. A tire according to claim 9, in which the amount of sulfur in said layer of rubber mix is between 5 and 8% of the total weight of elastomer.

12. A tire according to claim 1, in which the means for anchoring the carcass includes a layer of thermoplastic or thermosetting resin mix wherein the resin is selected from the group consisting of aliphatic polyamide, polyphenylene oxide and phenol formaldehyde resins.

13. A tire according to claim 1, in which the bead includes said circumferentially oriented cords arranged axially in several piles across its width.

14. A tire according to claim 1, in which a pile of circumferentially oriented cords extends to the portion of the sidewall below the equator of the sidewall.

15. A tire according to claim 14, in which the density of circumferentially oriented cords is less in the sidewall than in the bead.

16. A tire according to claim 1 in which one of said at least one pile of circumferentially oriented cords is arranged on each of opposite sides of the alignments in the bead.

17. A tire comprising at least one carcass anchored in each side of the tire and extending radially towards the bottom in a bead, the bead having a base which is intended to be mounted on the tire's design rim seat, each bead being extended radially upward by a sidewall, the sidewalls joining a tread, the carcass comprising portions of carcass cord which are arranged adjacent each other to form in the upper part of the sidewall a circumferential alignment of portions of cord extending downward to the bead, the alignment of carcass cord portions as they extend from the top of the sidewall towards the bottom of the bead being divided into at least two axially spaced circumferential alignments, the at least two axially spaced alignments having their radially lowermost ends axially spaced apart, and carcass anchoring means laterally bordering and being adhered to the alignments, the means for anchoring the carcass including at least one pile of circumferentially oriented cords, and in which each of said alignments in the bead is bordered laterally by at least one pile of circumferentially oriented cords.

18. A tire according to claim 17, in which the radially lowest ends of the carcass cord portions extend radially below the lowermost part of said adjacent at least one pile of circumferentially oriented cords.

19. A tire according to claim 17, in which, in the part of the sidewall located just above the region of intended contact with the design rim and below the equator, the rubber components located axially on opposite sides of the at least one carcass satisfy the following relationship $$\frac{\Sigma_i E_i e_i(\text{outside})}{\Sigma_j E_j e_j(\text{inside})} \geq 3$$

in which $E_i$ and $E_j$ are the radial moduli in the radial direction, and $e_i$ and $e_j$ are the thicknesses of each component "i" and "j" in rubber on the outside and inside, respectively, of the at least one carcass.

20. A tire comprising at least one carcass anchored in each side of the tire and extending radially towards the bottom in a bead, the bead having a base which is intended to be mounted on the tire's design rim seat, each bead being extended radially upward by a sidewall, the sidewalls joining a tread, the carcass comprising portions of carcass cord which are arranged adjacent each other to form in the upper part of the sidewall of circumferential alignment of portions of cord extending downward to the bead, the alignment of carcass cord portions as they extend from the top of the sidewall towards the bottom of the bead being divided into at least two axially spaced circumferential alignments, the at least two axially spaced alignments having their radially lowermost ends axially spaced apart, and the carcass anchoring means laterally bordering and being adhered to the alignments, the means for anchoring the carcass including at least one pile of circumferentially oriented cords, and including a layer of rubber mix having a Shore A hardness of more than 70 interposed between the at least one of the alignments and the circumferentially cords, and in which the layer of interposed rubber mix is a mix containing a styrene/butadiene rubber hereinafter referred to as an SBR synthetic elastomer the glass transition temperature $T_g$ of which is between $-70°$ C. and $-30°$ C., in a proportion of at least 40% of the total weight of elastomer.

21. A tire according to claim 20, in which the SBR synthetic elastomer is of solution type.

22. A tire according to claim 20, in which the amount of sulfur in said layer of rubber mix is between 5 and 8% of the total weight of elastomer and said mix contains adhesion-promoting additives.

23. A tire comprising at least one carcass anchored in each side of the tire and extending radially towards the bottom in a bead, the bead having a base which is intended to be mounted on the tire's design rim seat, each bead being extended radially upward by a sidewall, the sidewalls joining a tread, the carcass comprising portions of carcass cord which are arranged adjacent each other to form in the upper part of the sidewall a circumferential alignment of portions of cord extending downward to the bead, the alignment of carcass cord portions as they extend from the top of the sidewall towards the bottom of the bead being divided into at least two axially spaced circumferential alignments, the at least two axially spaced alignments having their radially lowermost ends axially spaced apart, carcass anchoring means laterally bordering and being adhered to the alignments, and a layer of rubber mix having a Shore A hardness of more than 70 interposed between the at least one of the alignments and the circumferentially oriented cords, the means for anchoring the carcass including at least one pile of circumferentially oriented cords, and in which the layer of interposed rubber mix is a mix containing styrene/butadiene rubber hereinafter referred to as an SBR synthetic elastomer wherein the SBR synthetic elastomer is blended with polybutadiene, the glass transition temperature Tg of which is between $-40°$ C. and $-10°$ C., the total proportion of SBR synthetic elastomer and polybutadiene being at least 40% of the total weight of elastomer.

24. A tire comprising at least one carcass anchored in each side of the tire and extending towards the bottom in a bead, the bead having a base which is intended to be mounted on the tire's design rim seat, each bead being extended radially upwardly by a sidewall, the sidewalls joining a tread, the carcass comprising portions of carcass cord which are arranged adjacent each other and form in the upper part of the sidewall a single circumferential alignment of portions of cord extending downward to the bead, the carcass as it extends radially from the top of the sidewall towards the bottom of the bead being divided into at least two axially spaced circumferential alignments, the carcass being made from a continuous carcass cord, all said portions of cord of each of the alignments of the bead being connected, two by two in each alignment, by a loop located at the radial level nearest the base of the bead, the bead comprising carcass anchoring means, including at least one pile of circumferentially oriented cords, laterally bordering and adhered to at least one of the axially spaced circumferential alignments, and in which the said loops are arranged radially at a level lower than the lowermost part of the adjacent pile or piles of circumferentially oriented cords.

* * * * *

UNITED STATES PATENT AND TRADEMARK OFFICE
CERTIFICATE OF CORRECTION

PATENT NO.  : 5,660,656
DATED       : Aug. 26, 1997
INVENTOR(S) : Herbelleau

It is certified that error appears in the above-identified patent and that said Letters Patent is hereby corrected as shown below:

Title page, Item 75, "Herbelleauu" should read --Herbelleau--.
Col. 2, lines 19 and 20, "the cord" should read --the cords--.
Col. 7, line 40, "plies" should read --piles--.
Col. 9, line 31, "sole layers" should read --sole purpose--.
Col. 14, line 1, "circumferentially" should read --circumferentially oriented--.

Signed and Sealed this

Twenty-eighth Day of April, 1998

Attest:

Attesting Officer

BRUCE LEHMAN

*Commissioner of Patents and Trademarks*